Sept. 12, 1950  A. BARUCH  2,522,084
CRANKPIN WORKING MACHINE TOOL
Filed May 14, 1946  8 Sheets-Sheet 1

INVENTOR.
Alfred Baruch.
BY
William F. Nickel
ATTORNEY.

Sept. 12, 1950

A. BARUCH 2,522,084

CRANKPIN WORKING MACHINE TOOL

Filed May 14, 1946

INVENTOR.
Alfred Baruch.
BY
William F. Nickel
ATTORNEY.

Sept. 12, 1950       A. BARUCH       2,522,084
CRANKPIN WORKING MACHINE TOOL Filed May 14, 1946             8 Sheets-Sheet 3

INVENTOR.
Alfred Baruch.
BY William F. Nickel
ATTORNEY.

Sept. 12, 1950     A. BARUCH     2,522,084
CRANKPIN WORKING MACHINE TOOL Filed May 14, 1946     8 Sheets-Sheet 4

INVENTOR.
Alfred Baruch.

BY William F. Nickel
ATTORNEY.

Fig. 5.

Sept. 12, 1950 A. BARUCH 2,522,084
CRANKPIN WORKING MACHINE TOOL
Filed May 14, 1946 8 Sheets-Sheet 6

INVENTOR.
Alfred Baruch.
BY
William F. Nickel
ATTORNEY.

Patented Sept. 12, 1950

2,522,084

UNITED STATES PATENT OFFICE 2,522,084

CRANKPIN WORKING MACHINE TOOL

Alfred Baruch, New York, N. Y.

Application May 14, 1946, Serial No. 669,563

14 Claims. (Cl. 82—9)

This invention comprises new and useful improvements in a crank pin working machine tool, and is a continuation in part of my co-pending application Serial No. 598,488, filed June 9, 1945, and entitled "Crank Pin Machine Tool," and now forfeited, which was a substitute for application Serial No. 516,343, filed December 31, 1943, and now abandoned.

The new improved machine is a portable tool designed to turn out in one operation one or more crank pins complete on a crank shaft, and is adapted for use in working crank shaft pins of various sizes, such as are used in Diesel engines, pumps and compressors.

The machine is so constructed that, instead of the stock being rotated about an axis through the pin centers in the usual way, the cutting and other tools turn around the pin as it is worked, thus insuring greater accuracy, since the distortion which comes from the side sway or "whip" of the shaft in rotational movement is eliminated.

The machine is also designed to make a full cut over the entire width of the cylindrical surface of the pin at each turn and once the tools are properly set the feed is all automatic and all likelihood of the occurrence of unevenness and the formation of high spots on the pins is obviated. The same holds true of other operations which are involved such as roughening, finishing, and hardening.

The machine is further designed to permit the correct adjustment of the tool or tools operating on the pins so that, regardless of the length of the pin, its radial distance from the adjacent main bearing, or its angular position with respect to the axis of the shaft carrying it, the members that support the tools rotating around the pin may be easily adjusted with speed and certainty to assure the accurate concentric revolution of the tools with respect to the axes of the pins.

Still further the machine is designed to permit many tools to be substituted for one another without altering the set-up in any substantial manner and to permit pressure-hardening of the fillets at the junctions of the pins with the crank arms, so as to prevent fractures or cracks at such places.

Generally speaking, the new machine is characterized by a pair of co-axial laterally spaced inner frame or ring members adapted to be mounted upon and encircle the crank arms at the ends of a crank pin on a crank shaft. Blocks or clamps on said members aid in mounting them on said crank arms and said blocks are adjustable transversely of the axis of the shaft as well as along said axis. Outer frame or ring members are rotatively mounted on said inner members and are associated with suitable driving means. A pair of separate tool posts on the outer frame members extend toward each other against the crank pin which is being treated, automatic means being provided for feeding said tools. The apparatus also includes abutting shoe elements mounted on said outer frame members for bracing and steadying tools in their operation.

The invention also includes an attachment on which are arranged separate steel balls to bear with force against the aforesaid fillets on the pins to pressure-harden the pins at said fillets for the purpose above set forth.

For further comprehension of the invention, and of the objects and advantages thereof, reference is had to the following description and accompanying drawings; and in the appended claims the various novel features of the invention are particularly defined.

In the accompanying drawings, which form a material part of this disclosure.

The preferred form of the invention which is shown in the drawings is a multi-unit machine which can be assembled to treat several pins at one time. However the construction of each unit and its associated parts are the same, so that a description of one will suffice for all.

Figure 3:
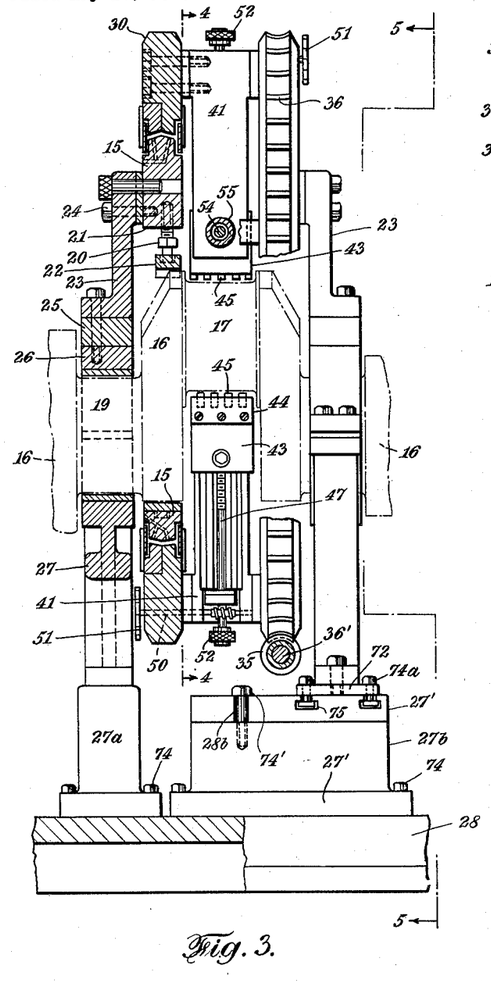
Figure 3 is a longitudinal, vertical section taken on the line 3—3 of Figure 2.
Figure 4:
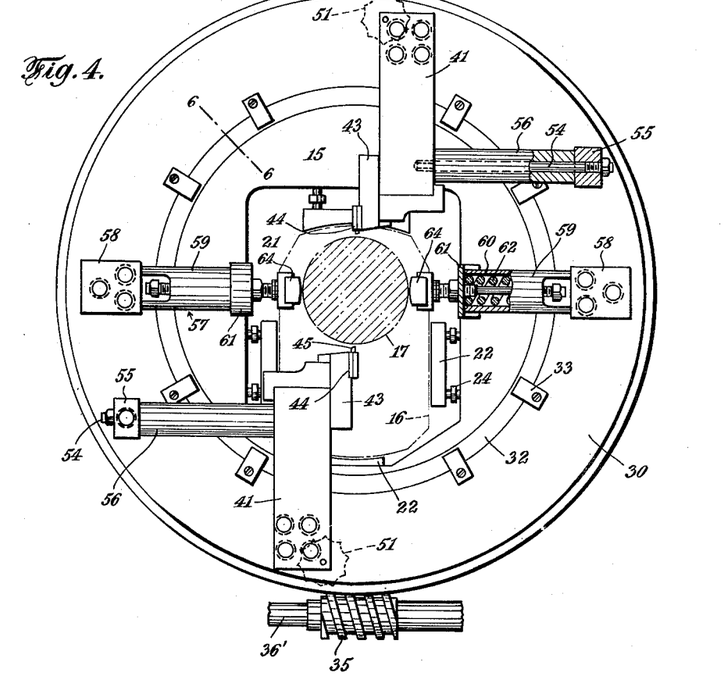
Figure 4 is a vertical transverse section taken on the line 4—4 of Figure 3.
Figure 5:
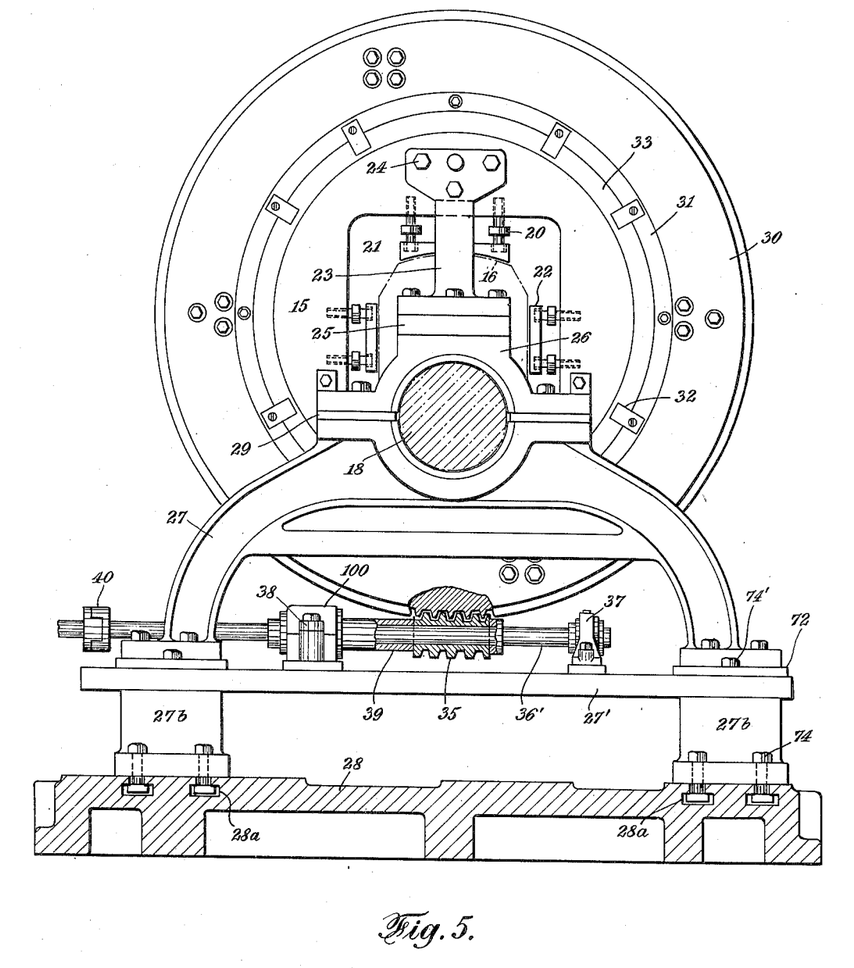
Figure 5 is a vertical transverse section taken on the line 5—5 of Figure 3.

As best shown in Figures 3, 4, and 5 to start with, each unit of the machine, in accordance with this invention, includes a pair of co-axial, laterally spaced stationary inner frame or ring members 15 adapted to be affixed to and encircle the crank arms 16 of the crank shaft 18 at the ends of a pin 17, said shaft having main bearings 19 adjacent the arms 16. The supporting rings or frames 15 are connected with the arms 16 by clamping means which include blocks 22 (Figure 4) and adjusting screws 24 threadably mounted in the edges of the openings 21 which are formed in the rings 15 to receive the arms 16. These blocks are preferably at least four in number to engage both sides and both ends of the arms 16 to give all necessary adjusted positions of the rings 15 on the crank arms.

The inner frames 15 are supported on arms 23 secured to the sides of said frames or rings by fastening screws 24. These arms are mounted with interposed shims 25 upon pedestal caps 26. These pedestal caps are removably attached to pedestals 27 which in turn are mounted upon and connected to a bed 28 in a manner later to be described below. The shims 25 are interposed between the pedestals 27 and the pedestal cap 26. Similar shims are used wherever necessary. The caps and pedestals engage the portions 19 of the shaft 18 between the arms 16.

Figure 1:
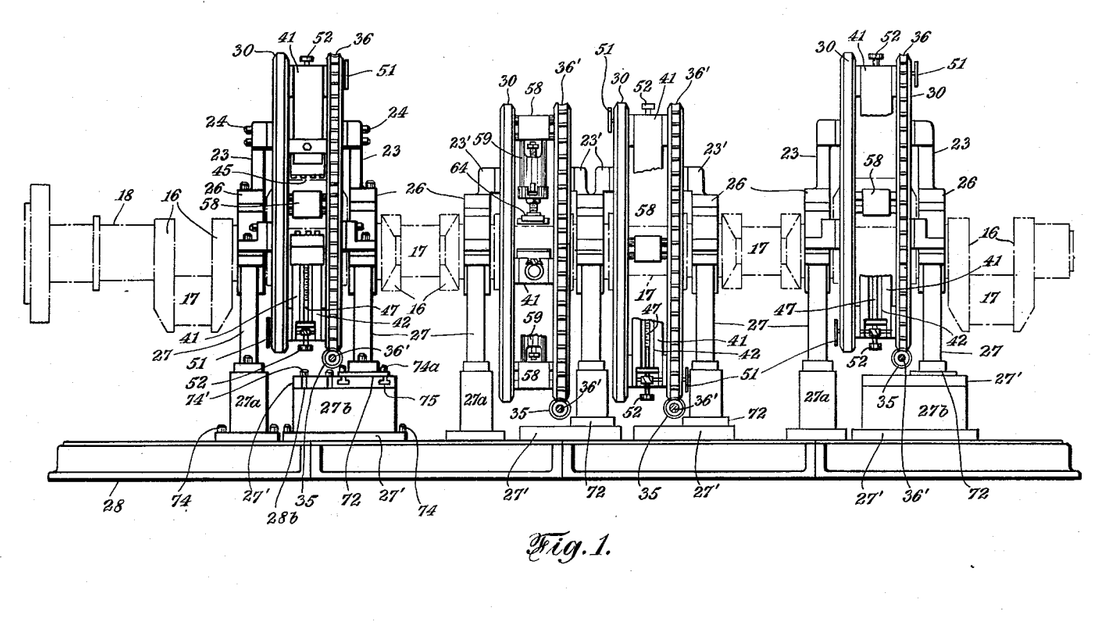
Figure 1 is a side elevation of a machine for treating several crank pins at the same time.
Figure 2:
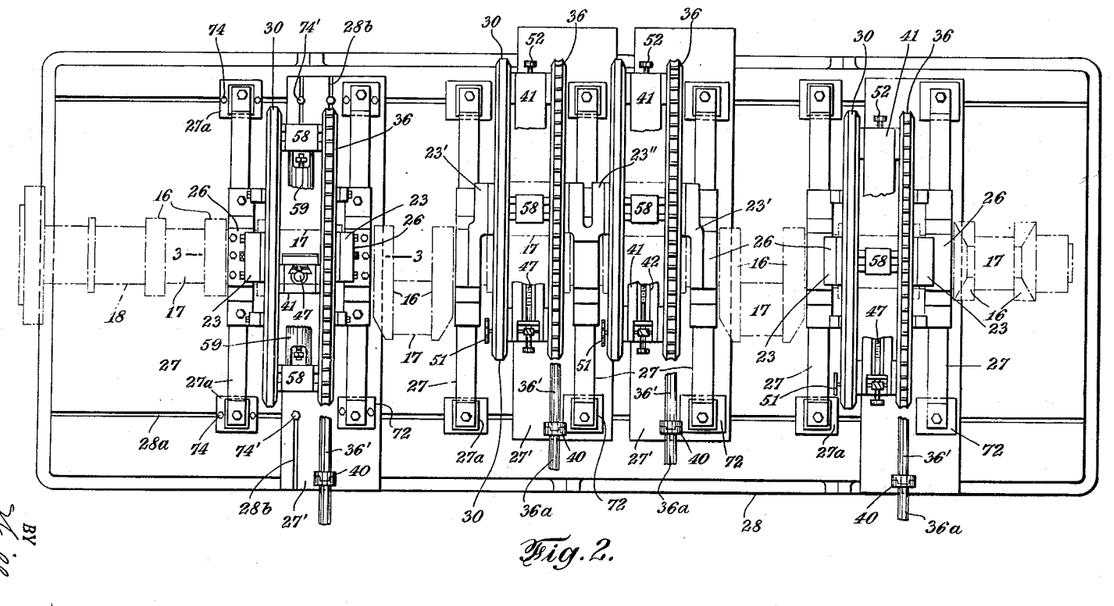
Figure 2 is a plan view of said machine.

The shaft 18, as illustrated in Figures 1 and 2, has for example, eight cranks. At the extremities the cranks have their pins in lowermost position. Adjacent each of these is a crank with its pin uppermost and these cranks are held fast by the apparatus so that their pins can be worked as desired. On the other side of each of these upturned cranks is a crank that is horizontal, pointing for instance to the side of the apparatus appearing as the front side in Figure 1. Between these two horizontal cranks is another pair of horizontal cranks at the middle of the shaft, pointing in the opposite direction, and secured in the machine so that their pins are also in process of being treated. Thus four pins can be worked at once; then the pedestals are shifted along the base 23 so that the other cranks can be engaged and the remaining four pins are treated in the same way as the first group.

Figure 6:
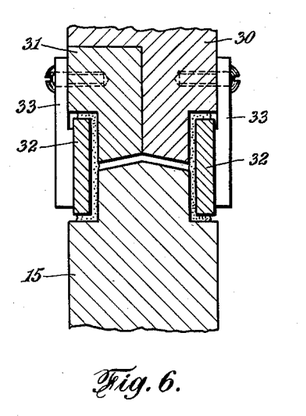
Figure 6 is a fragmentary enlarged sectional detailed view of a portion of the inner and outer frame members of the device.

The outer supporting frames or rings 30 are rotatively mounted on said inner members 15. The contacting rims of these rings are angular to facilitate rotative engagement of these parts. Figure 6 shows the details of this mounting arrangement, the rings 15 having low ridges on the rims and the rings 30, shallow grooves. Retaining rings 31 for holding the outer frames rotative on the inner frames are removably attached to one of the faces of the outer frames 30, suitably shouldered at the rim to provide seats for rings 31. The inner face of each ring 31 forms half the surface of the grooves in the frame 30 carrying it. Oil seal rings 32 forming part of a lubricating system for the outer frames or rings are disposed within recesses formed in the adjacent faces of the frames 15 and 30, and cleats 33 serve to hold the rings 32 in position.

Figure 7:
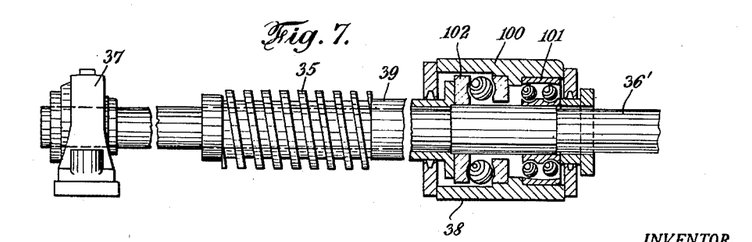
Figure 7 is a fragmentary detailed sectional view of the structure of the means for driving the apparatus.

For each crank pin secured for operation in the machine, a pair of inner and a pair of outer frames are used. One of the outer rings 30 of each pair is associated with drive means, such as worm 35 meshing with worm teeth 36 cut upon the periphery of said outer ring 30. This worm 35 is mounted upon a drive shaft 36' rotatively supported in bearings 37 mounted on a transverse base plate 27'. One of these plates 27' supports the pedestal or stanchion 27 for each ring 30 with teeth 36 and its encircled ring 15. Each drive shaft 36' also has a thrust bearing 38 also fixed on the plate 27'. A thrust sleeve 39 projects from the bearing 38 against one end of the worm 35. Figure 7 shows the thrust bearing, which includes a housing 100 enclosing an anti-friction section 101 having horizontal races and balls and a section 102 having vertical races and balls. A coupling 40 connects the shaft 36' with any suitable source of power, through shafts 36a.

Figure 8:
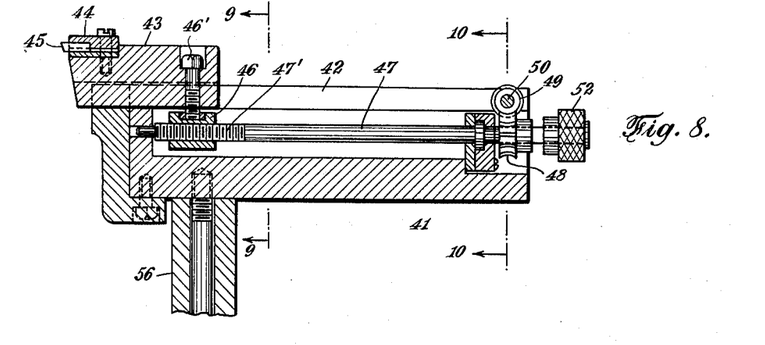
Figure 8 is a longitudinal sectional view of one of the tool carrying posts and associated parts of the device.
Figure 9:
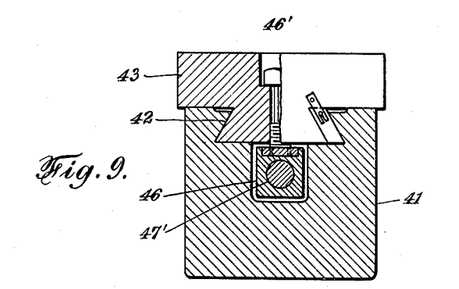
Figure 9 is a transverse, vertical section taken on the line 9—9 of Figure 8.
Figure 10:
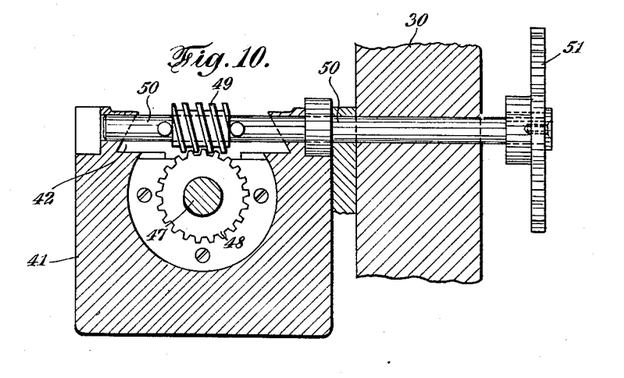
Figure 10 is a similar view taken on the line 10—10 of Figure 8.

Posts 41 are mounted between the outer frames 30 of each unit and serve rigidly to connect said frames together, being held thereto by screws; and also serve for carrying the necessary tools. These posts are mounted at separated points preferably a semi-circle apart, so that cutting tools are similarly spaced and oppose each other to offset the thrust reaction of the tools while the crank pin is being worked. Each tool post 41 is provided with a channel way 42 in which the tool holder 43 is slidably mounted. Each tool holder is provided with a bit holder 44 for supporting the tools 45 which engage the crank pin surface. The tools 45 are side by side and cover the full length of the pin 17 so that a full cut is made of the entire length of the pin at each rotation of the outer rings 30 around the pin. To each tool holder 43 is affixed a stud 46 by a screw 46' and the stud is threadably engaged by a rod 47 rotatively mounted in bearings on the tool post 41. This rod 47 carries at its end a worm gear 48 meshing with a worm 49 upon a transverse shaft 50, which is rotatively mounted on the tool holder 41 at the end remote from the bit 44. One shaft 50 passes through one of the rings 30 and the other through the remaining ring 30; and to the outer end of each shaft 50 is affixed a feed wheel 51. The wheel 51 is turned to rotate the rod 47 which thus moves the tool holder 43 for feeding the tool bit 44. Rod 47 has threads 47' in the stud 46.

In certain circumstances said wheels 51 may be eliminated and the tool holders may be manually fed by turning the milled knobs 52 upon the outer ends of the shafts 47. If instead of the knobs 52, the feed wheels 51 are used, then automatic means are included for turning the shafts 47. The tool posts 41 are each reinforced by a brace rod 54 threadably engaged with one side of the tool post and extending at right angles to said post. This rod 54 passes through a block or stud 55 which is fixed on and between the outer rings 30. A reinforcing tube 56 is mounted between the block 55 and the side of the tool post 41 and encircles the rod 54. Because the tool post reinforcing and bracing means 54, 56 is at right angles to the radial position of the tools 45, it will hold the toolpost tight and reduce or eliminate "chattering" when the machine is running.

Figure 12:
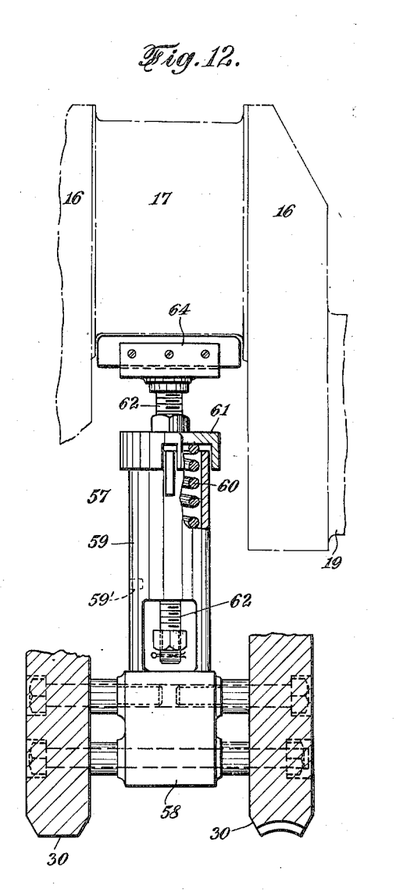
Figure 12 is a fragmentary elevational view of one of the parts for guiding and steadying the members supporting the tool posts in their revolution about each crank pin, broken away in some measure to disclose the interior.

Each unit of the apparatus comprising two pairs of inner and outer rings 15 and 30, with the tools and tool holders, is further safeguarded against vibration or "chattering" and the constant engagement of the tools 45 with the pins 17 is assured by a pair of members 57. Each includes a stud 58 fixed to the outer rings 30 and provided with a radially and inwardly projecting cylindrical extension 59 suitably attached thereto or integral therewith. A compressed spring 60 is housed in each extension 59, engaging stop pins 59' at one end (Figure 12) and acting at its opposite end against a slidably mounted cap 61 on the end of the extension 59. This cap supports a threaded rod 62 provided with a contact shoe 64 mounted on its outer end. These shoes 64 are pressed against the crank pin 17, and keep the unit carrying them in position for the tools to maintain smooth engagement with the pins over the whole circumference of same.

Figure 11:
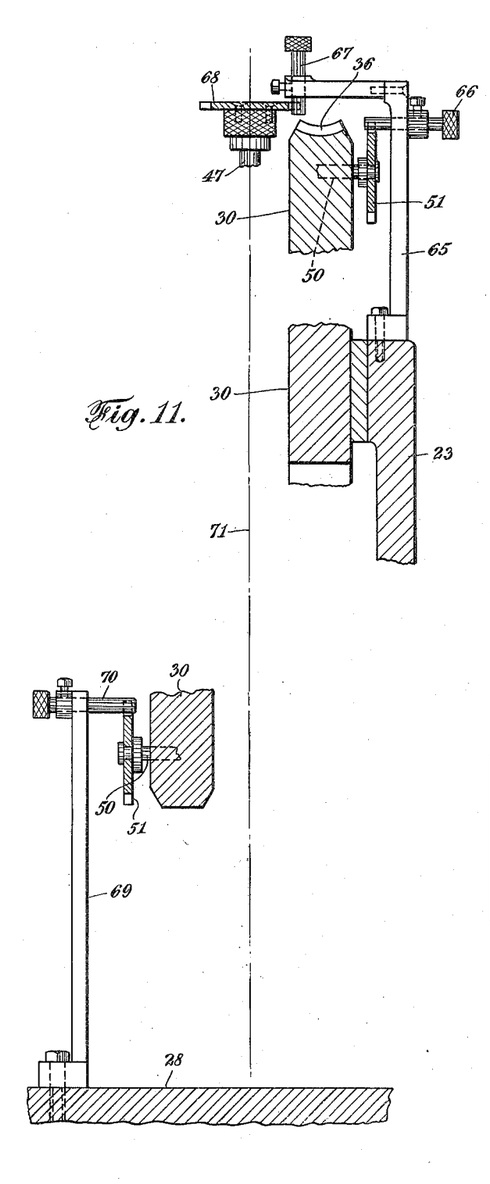
Figure 11 is a fragmentary schematic elevational view showing details of the tool-feeding mechanism.

Each group of tools 45 on a holder 41 has automatic feeding means comprising a post 65, mounted upon one of the inner ring supporting arms 23 and carrying a pin 66 which cooperates with one of the feed wheels 51 to turn the feed wheel an angular distance each time that the outer frame 30 carrying the wheel 51 passes a position in which the feed wheel strikes the pin 66. The post 65 also bears a second pin 67 cooperative with a second tool feed wheel 68 shown mounted upon the rod 47 in place of knob 52 for feeding the tools when turning the rounded outer ends of crank arms 16. For this purpose a bit different from the bit 41 and carrying different tools may be utilized and the rings 30 are merely oscillated or rocked in a manner not necessary to be illustrated herein. A second post or bracket 69 is mounted upon the base 28 and supports a pin 70 for cooperation with the tool feed wheel 51 of the other tool holder on the unit. In Figure 11 the dot and dash line 71 indicates the center line of the crank pin between the arms 16. It should be noted that the tool feed wheels 51 for the two tool posts 41 are located on the outer faces of the outer rings 30 and in diametrically opposite position.

Referring to Figures 1 and 2, there are four crank pins to be worked at the same time and they are located at different points along the shaft 18 and are differently disposed in angular position with respect to the shaft, two cranks being vertical and in top position; and two being horizontal. The vertical cranks are beside the pins 17 at the extremities of the shaft and the horizontal cranks are in the middle of the shaft 18, as above described. The spaced concentric rings must be mounted the exact distance apart and in accurate axial relation to the pins 17, and so held by means of the pedestals 27 on the bed 28. Therefore the workman must be able to adjust these pedestals with a great degree of exactness. In other words, each unit of the apparatus must be in true position along the shaft 18, and especially with respect to the adjacent main bearings 19; and the centers of rings 30 must be at the same radial distance from the axis of the shaft 18 as the axes of the pins 17. Then the cylindrical surfaces of the pins can be treated with the exactitude required. To this end three of the pedestals 27, all supporting rings 30 that have no teeth 36 on the rims, as presented in Figure 2 (the first, third and six pedestals from the left), are mounted on feet 27a, which have flanges around their lower edges to receive bolts 74. The bed 28 has longitudinal slots 28a in its upper surface one along each side. These slots will be undercut along their opposite edges, as shown in Figure 3; and the bolts 74 will so engage the feet 27a and slots 28a that the three pedestals mentioned can be adjustably shifted along the length of the bed 28. The bolts may engage sliding retainers or shoes slipped into the slots 28 at the ends and held down by the projecting edges of the slots; or put into the slots through openings in the top of the bed 28 at suitable points, as will be understood. No other adjustment of these three pedestals is needed because they support the shaft at the parts 19 between the crank 16. The slots 28a may be single along each side of the bed as appears in Figure 1, which shows the parts with less detail, or double as in Figure 5.

The other four pedestals 27 are bolted on foot plates 72 and can also be adjusted axially of the shaft 18 because the plates 72 are supported on the base plates 27' that are likewise movably secured to the bed 28 by means of additional bolts 74 which engage the slots 28a, and retain the base plates 27' in position to be shifted lengthwise of the bed 28 in the same way as the three pedestals 27 above mentioned. The second and third plates 27' from the left in Figures 1 and 2 rest directly on the bed 28; the first and fourth on sliding blocks or shoes 27b with flanges 27'' through which the bolts 74 are passed. These first and fourth base plates also have slots 28b extending inward from their opposite ends. Bolts 74' pass through these plates 27' into the slots 28b. Thus these two base plates 27' can be adjusted with the shoes 27b either along the length of the bed 28, or on the shoes 27b crosswise thereof, and secured when the bolts 74 and 74' are screwed tight. The slots 28b and bolts 74' are shown for only the first plate 27' in Figures 1 and 2, and omitted from the other plates 27' for convenience and clearness. The second and third pedestals supported on plates 27' resting directly on the bed 28 can be adjusted crosswise and lengthwise of the bed because of similar slots 28b therein and bolts 74' which pass through the slots 28b into the slots 28a, and hold these plates 27' in adjusted position. All four pedestals 27 which carry the rings 30 having the teeth 36 can be given a short final adjustment transverse to the shaft 18 because of bolts 74a passing through the plates 72 under the pedestals and engaging short slots 75, with undercut edges like the slots 28a in the bed 28, and running crosswise of the slots 28a. See Figure 3.

The rings 15 therefore can be mounted in true positions at the correct height with respect to the axis of the shaft 18, by means of the shims 25, and in precise alinement at the proper distance apart by adjustment of all the pedestals 27 along the bed 28 and the transverse adjustment of the base plates 27' and foot plates 72. Since the distance from the axial center of a main bearing 19 to the axial center of an adjacent pin is known and since the length of the pin and its distance from the main bearing 19; i. e. the thickness of the arms 16, is also known, the above mentioned method of adjusting is exceedingly useful to produce exact results.

Figure 13:
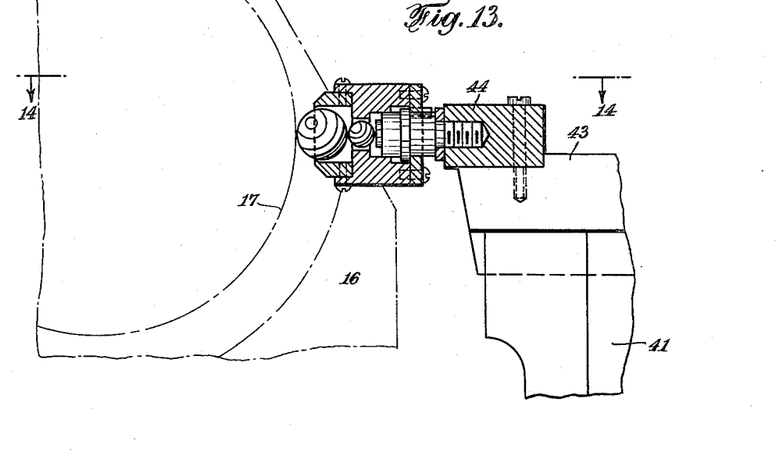
Figure 13 is a longitudinal vertical section through the mechanism for pressure-hardening the fillets; and, Figure 14 is a plan view, partly in section, of the mechanism of what appears in Figure 13.
Figure 14:
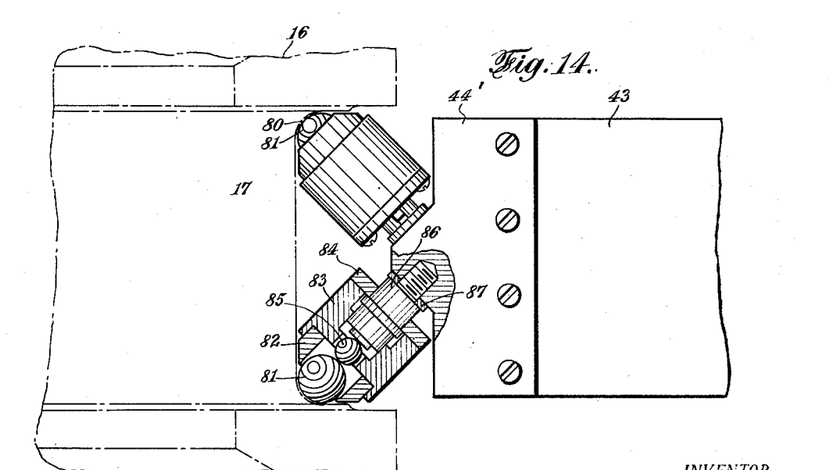

The invention finally includes means to harden by pressure the fillets 80 which lie at the juncture of the pin 17 with the arms 16 since breaks or fractures often occur at these points. This tendency is greatly reduced by the hard rolling of these curved corners as shown in Figures 13 and 14. The fillets 80 are treated by means of steel balls 81 held in ball races 82 in housings 83 having end closure disks 84. Back of the ball 81 in the housing 83 is a small bearing ball 85, against which presses a rod 86 passing through the disk 84 and spaced by a shim 87 the required distance from the tool holding bit 44' into which the threaded rear end of the mounting stud or rod 86 is screwed. This bit is mounted on the holder 43 which, in the manner previously described is slidable with respect to the tool posts 41. It is observed that there are two steel balls 81 each in its separate race element but with the studs 86 divergently disposed so that as they are advanced the balls will press and roll the corner fillets 80 as the rings 30 rotate around the pin 17. Of course it is feasible to mount other tools on bits in the holders 43 for other operations if desired.

The operation of the device may be understood from the following:

The crank shaft 18 is laid level on frames or supports; one end is lifted and the frames 15 and 30 of the four units are disposed upon the shaft. The rings 15 are made fast to the two arms 16 of each of the four cranks, and the outer rings 30 for the four units are then adjusted on the shaft; the latter passing through the rings 30. The rings 30 can be paired first and each ring 30 with a smooth circumference secured to a ring having teeth 36 on its rim. The pedestals 27 all stand equal distances above the base 28; they are of the same height; and at their upper ends they can receive the portions 19 of the shaft, so as to support it parallel to the base at all points. With the caps 26 removed, the pedestals or stanchions 27 can be moved along the bed into position to receive the portions 19 of the shaft in the semi-cylindrical recesses in the tops of said stanchions. The rings 15 are shifted to make their centers aline closely with the axes of the pins 17. This adjusting is done easily because of the openings 21 in the inner rings 15 are much larger than the cranks 16, and the screws 24 are readily manipulated. The blocks 22 and the screws 24 thus fasten the inner rings 15 rightly to the cranks. One ring 15 of each unit may be handled first. The two outer rings 30 of the unit are already assembled together through the tool posts 41 and the studs 55 and 58. This assembly is shifted on the crank shaft so that one outer ring 30, say at the left, Figure 2, rests on the left hand inner frame 15. The retaining ring 31, the oil rings 32 and cleats 33 are then bolted into position.

The other inner ring 15 is then set into final position in a similar manner and the retainer ring 31, oil rings and cleats are bolted on the other ring 30. This completes the assembly of the unit over one crank pin 17. The other units are managed in the same way. The crank shaft 18, rings 15 and 30 and connected parts are now lifted over the base 28 of the machine and set on the pedestals 27 so that the adjoining main bearings 19 of the pins 17 to be worked rest on the pedestals. The shims 29 and caps 26 are then bolted on. The shims 25 are set on the caps 26, and the arms 23 are bolted thereto and upon the inner rings 15 and the machine is now ready for operation except for the final step of adjusting some pedestals 27. The opposite ends of the crank shaft 18 can still rest on supports. This final adjustment is effectuated by means of the bolts and slots above described so that the center of each outer ring 30 can be disposed concentric with the axis of a pin 17 and at the exact longitudinal distance from the main adjacent bearing 19. The pedestals on the members 27a can be moved upon the bed 28 and secured thereto; two other pedestals can be adjusted by moving their plates 27' along and crosswise of the bed; and additionally across the bed by reason of the slots 75 in the plates 27'. The pairs of inner and outer rings of all the units are set up with respect to the pins 17 in the manner above described. As illustrated in Figures 1 and 2, the arms 23 are upright on the pedestals 27 for the cranks in top position near the two ends of the shaft. The cranks in horizontal position at the middle of the shaft are lower. Hence the arms 23' for the three stanchions at the center are horizontal, the cap for the central stanchion here supporting two such arms 23'. These arms are properly shaped at their ends so as to be easily secured as before to the caps 26.

The rings 30 in final position will be concentric with the pins 17, and the presence of the blocks 22 assures this. Though not shown on Figure 4, screws 21 for the bottom blocks 22 may also be provided.

When all the sets of discs and associated parts are thus assembled suitable tools are set in each of the tool blocks and the arms 16 may be brought down to size in one cut. Next the multiple pin roughing tools and the fillet form cutters are set in the tool holders and the pin is worked roughly. The shaving form cutters are then set in and the pin brought down to finished size unless normal procedure calls for hardening before grinding. In such case .020" is left on for grinding. If the pin is not hardened before the final stage, grinding is not necessary by this process because the shaving tool produces a finish that is equivalent to grinding.

When the drive shafts 38' rotate, motion will be transmitted by the worm 35 to the teeth 36 upon one of the outer rings 30 to drive the outer rings and associated parts. Once during each rotation, the tool feed wheels 51 (or wheel 68) will strike the pins 66 and 70 (or 67) and thus automatically actuate the tool feed mechanism.

While I have illustrated and described the preferred embodiments of my invention, it is to be understood that I do not limit myself to the precise constructions herein disclosed and the right is reserved to all changes and modifications coming within the scope of the invention as defined in the appended claims.

Having described my invention, what I claim as new and desire to secure by United States Letters Patent is:

1. A machine for working on crank pins disposed between crank arms on a shaft comprising a pair of coaxial laterally spaced stationary inner rings adapted to be mounted about the crank arms at the ends of a pin on the shaft, an outer ring surrounding each inner ring, clamp means for connecting said inner rings to said arms mounted on said inner rings, means for driving said outer rings, a pair of tool posts mounted spaced apart on said outer rings, tools movably mounted on said tool posts for engaging the full length of said crank shaft pin, means for feeding said tools toward said crank shaft pin, and resilient shoes mounted on said outer rings for engaging said pin.

2. A machine for working on crank pins disposed between crank arms on a shaft comprising a pair of coaxial laterally spaced stationary inner rings adapted to be mounted about the arms of the crank shaft at the ends of a pin on said shaft, clamp means for connecting said inner rings with said arms, means for supporting said inner rings, outer rings rotatively mounted on said inner rings, means for driving said outer rings, a pair of tool posts spaced apart on said outer rings, tools movably mounted on said tool posts for engaging the full length of said crank shaft pin, means for feeding said tools towards said crank shaft pin, and resilient shoes carried by said outer rings for engaging said pin, each shoe having a stud fixedly mounted between said outer rings, said stud having a tubular extension, an expansion spring mounted within said tubular portion, a cap slidably mounted on said extension and urged outward by said spring, and means for limiting motion of said cap, the shoe being fixed with respect to said cap for making contact with said crank pin.

3. A machine for working on crank pins disposed between crank arms on a shaft comprising a pair of coaxial laterally spaced stationary inner rings adapted to be mounted about the crank arms at the ends of a pin on the shaft, clamp means on said rings for connecting said inner rings with said arms, means for supporting said inner rings, outer rings rotatively mounted on said inner rings, means for driving said outer rings, a pair of tool posts spaced apart on said outer rings, tools movably mounted on said tool posts for engaging the full length of said crank shaft pin, means for feeding said tools towards said crank shaft pin, and resilient shoes mounted on said outer rings for engaging said pin steady, said shoes being arranged 90 degrees from said tool posts.

4. A machine for working on crank pins disposed between crank arms on a shaft comprising a pair of coaxial laterally spaced stationary inner rings adapted to be mounted about the crank arms at the ends of a pin on the shaft, clamp means for connecting said inner rings with said arms, means for supporting said inner rings, outer rings rotatively mounted on said inner rings, means for driving said outer rings, tool posts mounted on said outer rings, tools movably mounted on said tool posts for engaging said crank shaft pin, means for feeding said tools towards said crank shaft pin, and resilient shoes mounted on said outer rings for engaging said pin, said shoes being disposed on opposite sides of said pin between said tool supports.

5. A machine for working on crank pins disposed between crank arms on a shaft comprising a pair of coaxial laterally spaced stationary inner rings adapted to be mounted about the crank arms at the ends of a pin on the shaft, clamp means for connecting said inner rings with said arms, means for supporting said inner rings, outer rings rotatively mounted on said inner rings, means for driving said outer rings, tool posts mounted on said outer discs, tools movably mounted on said tool posts for engaging said crank shaft pin, means for feeding said tools towards said crank shaft pin, and resilient shoes mounted on said outer rings for engaging said pin, each shoe having a stud fixed between said outer rings, said stud having a tubular extension, an expansion spring mounted within said extension, a cap slidably mounted on said stud and urged outwardly by said spring, means for limiting motion of said cap, the shoe being mounted upon said cap, said cap having a rod affixed thereto and disposed within said tubular extension surrounded by said spring.

6. A machine for working on crank pins disposed between crank arms on a shaft comprising a pair of coaxial laterally spaced stationary inner rings adapted to be mounted about the crank arms at the ends of a pin on the shaft, clamping means for connecting said inner rings with said arms, means for supporting said inner rings, outer rings rotatively mounted on said inner rings, means for driving said outer rings, tool posts mounted on said outer rings, tools movably mounted on said tool posts for engaging said crank shaft pin, means for feeding said tools towards said crank shaft pin, and resilient shoes mounted on said outer rings for engaging said pin, and each shoe having a stud fixed to said outer rings, said stud having a tubular extension, an expansion spring mounted within said extension, a cap slidably mounted on said extension and urged outwardly by said spring, and a rod attached to said cap and disposed within said extension, said expansion spring surrounding said rod.

7. A crank pin working machine for the pins of shafts having crank arms at the ends of said pins and main bearings adjacent thereto, comprising a pair of inner rings disposed around said arms, means for adjusting said rings to make their perimeters concentric to the axis of the pin, means for supporting said rings, means for adjusting said supporting means longitudinally and transversely of the axis of said pin, outer rings rotatable around said inner rings, tools supported between said outer rings, means to rotate said outer rings, and means to advance said tools towards said pin.

8. A crank pin working machine for the pins of shafts having crank arms at the ends of said pins and main bearings adjacent thereto, comprising a pair of inner rings disposed around said arms, means for adjusting said rings on said arms to make same concentric to the axis of the pin, pedestals connected to said rings and having bearings for the shaft between said pins, plates on which said pedestals are mounted, means for adjusting the pedestals on said plates transversely of the axis of the pin, base plates supporting said pedestal plates, a bed on which the base plates are disposed, means for adjusting the base plates on said bed longitudinally of the axis of the pin, outer rings rotatably disposed on said inner rings, tools disposed between said outer rings, means for advancing said tools towards said pin, means on the base plates for driving said outer rings and means on the machine to engage the advancing means at each rotation of the outer rings to actuate said advancing means.

9. A crank pin machine tool, comprising a pair of coaxial laterally spaced stationary inner discs adapted to be mounted about the throws at the ends of a pin of a crankshaft, clamp means for connecting said inner discs with said throws, means for supporting said inner discs, outer discs rotatively mounted on said inner discs, means for driving said outer discs, a pair of tool posts spaced apart on said outer discs, tools movably mounted on said tool posts for engaging completely along the length of said crank shaft pin, means for feeding said tools towards said crank shaft pin, and resilient follower rests mounted on said outer discs for assisting in holding said pin steady for eliminating chatter.

10. A crank pin machine tool, comprising a pair of coaxial laterally spaced stationary inner discs adapted to be mounted about the throws at the ends of a pin of a crank shaft, clamp means for connecting said inner discs with said throws, means for supporting said inner discs, outer discs rotatively mounted on said inner discs, means for driving said outer discs, a pair of tool posts spaced apart on said outer discs, tools movably mounted on said tool posts for engaging completely along the length of said crank shaft pin, means for feeding said tools towards said crank shaft pin, and resilient follower rests mounted on said outer discs for assisting in holding said pin steady for reducing or eliminating chatter, and each follower rest including a bracket fixedly mounted between said outer discs, said bracket having a tubular portion, an expansion spring mounted within said tubular portion, a cap slidably mounted on said bracket and urged outwards by said spring, means for limiting motion of said cap, and a support member mounted upon said cap for engaging said crank pin.

11. A crank pin machine tool, comprising a pair of coaxial laterally spaced stationary inner discs adapted to be mounted about the throws at the ends of a pin of a crank shaft, clamp means for connecting said inner discs with said throws, means for supporting said inner discs, outer discs rotatively mounted on said inner discs, means for driving said outer discs, a pair of tool posts spaced apart on said outer discs, tools movably mounted on said tool posts for engaging completely along the length of said crank shaft pin, means for feeding said tools towards said crank shaft pin, and resilient follower rests mounted on said outer discs for assisting in holding said pin steady for reducing or eliminating chatter, and said resilient follower rests being spaced from said tool supports.

12. A crank pin machine tool, comprising a pair of coaxial laterally spaced stationary inner discs adapted to be mounted about the throws at the ends of a pin of a crank shaft, clamp means for connecting said inner discs with said throws, means for supporting said inner discs, outer discs rotatively mounted on said inner discs, means for driving said outer discs, a pair of tool posts spaced apart on said outer discs, tools movably mounted on said tool posts for engaging completely along the length of said crank shaft pin, means for feeding said tools towards said crank shaft pin, and resilient follower rests mounted on said outer discs for assisting in holding said pin steady for eliminating chatter, said resilient follower rests being disposed on diametrically opposite sides of said pin midway between said tool supports.

13. A crank pin machine tool, comprising a pair of coaxial laterally spaced stationary inner discs adapted to be mounted about the throws at the ends of a pin of a crank shaft, clamp means for connecting said inner discs with said throws, means for supporting said inner discs, outer discs rotatively mounted on said inner discs, means for driving said outer discs, a pair of tool posts spaced apart on said outer discs, tools movably mounted on said tool posts for engaging completely along the length of said crank shaft pin, means for feeding said tools towards said crank shaft pin, and resilient follower rests mounted on said outer discs for assisting in holding said pin steady for reducing or eliminating chatter, and each follower rest including a bracket fixedly mounted between said outer discs, said bracket having a tubular portion, an expansion spring mounted within said tubular portion, a cap slidably mounted on said bracket and urged outwards by said spring, means for limiting motion of said cap, and a support member mounted upon said cap for engaging said crank pin, said cap being mounted on a rod extended through said tubular portion and extended from the back end thereof, said limiting means comprising a stop nut mounted on the extended end of said rod.

14. A crank pin machine tool, comprising a pair of coaxial laterally spaced stationary inner discs adapted to be mounted about the throws at the ends of a pin of a crank shaft, clamp means for connecting said inner discs with said throws, means for supporting said inner discs, outer discs rotatively mounted on said inner discs, means for driving said outer discs, a pair of tool posts spaced apart on said outer discs, tools movably mounted on said tool posts for engaging completely along the length of said crank shaft pin, means for feeding said tools towards said crank shaft pin, and resilient follower rests mounted on said outer discs for assisting in holding said pin steady for reducing or eliminating chatter, and each follower rest including a bracket fixedly mounted between said outer discs, said bracket having a tubular portion, an expansion spring mounted within said tubular portion, a cap slidably mounted on said bracket and urged outwards by said spring, a rod attached to the cap at one end, a nut on the rod for limiting motion of said cap, and a support member mounted upon said cap for engaging said crank pin, said expansion spring encircling said rod.

ALFRED BARUCH.

REFERENCES CITED

The following references are of record in the file of this patent:

UNITED STATES PATENTS

| Number | Name | Date |
| --- | --- | --- |
| 57,620 | Bogardus | Aug. 28, 1866 |
| 322,320 | Reed | July 14, 1885 |
| 668,863 | Vogel | Feb. 26, 1901 |
| 790,519 | Moll | May 23, 1905 |
| 1,554,611 | Weydell | Sept. 22, 1925 |
| 2,016,482 | Brown | Oct. 8, 1935 |
| 2,201,664 | Ferguson | May 21, 1940 |
| 2,357,515 | Jackman | Sept. 5, 1944 |

FOREIGN PATENTS

| Number | Country | Date |
| --- | --- | --- |
| 337,705 | Germany | June 4, 1921 |